United States Patent
Zhang et al.

(10) Patent No.: US 8,417,951 B2
(45) Date of Patent: Apr. 9, 2013

(54) ROAMING AUTHENTICATION METHOD BASED ON WAPI

(75) Inventors: Bianling Zhang, Shaanxi (CN); Jun Cao, Shaanxi (CN); Xiaolong Lai, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

(21) Appl. No.: 12/990,580

(22) PCT Filed: May 11, 2009

(86) PCT No.: PCT/CN2009/071720
§ 371 (c)(1),
(2), (4) Date: Nov. 1, 2010

(87) PCT Pub. No.: WO2009/135445
PCT Pub. Date: Nov. 12, 2009

(65) Prior Publication Data
US 2011/0055569 A1    Mar. 3, 2011

(30) Foreign Application Priority Data
May 9, 2008 (CN) .......................... 2008 1 0018166

(51) Int. Cl.
*H04W 12/06* (2009.01)
(52) U.S. Cl.
USPC ............ 713/170; 455/411; 380/247; 380/277
(58) Field of Classification Search .................... None
See application file for complete search history.

(56) References Cited

U.S. PATENT DOCUMENTS
8,225,092 B2 * 7/2012 Lal et al. ........................ 713/168
2005/0166043 A1  7/2005 Zhang et al.
2006/0135155 A1 * 6/2006 Chung et al. ................ 455/432.1
2008/0072057 A1  3/2008 Zhang et al.
2009/0019284 A1 * 1/2009 Cho et al. ........................ 713/170
2011/0055561 A1 * 3/2011 Lai et al. ......................... 713/168
2011/0185171 A1 * 7/2011 Karasawa et al. .............. 713/156
2011/0314286 A1 * 12/2011 Tie et al. ........................ 713/171

FOREIGN PATENT DOCUMENTS
| CN | 1671136 A | 9/2005 |
|----|-----------|--------|
| CN | 1674497 A | 9/2005 |
| CN | 101018174 A | 8/2007 |
| CN | 101018175 A | 8/2007 |

(Continued)

OTHER PUBLICATIONS
A new authentication and key management scheme of WLAN, Haojun Zhang et al( IEEE Date of conference Oct. 25-27, 2006).*

(Continued)

*Primary Examiner* — Fikremariam A Yalew
(74) *Attorney, Agent, or Firm* — Harness, Dickey & Pierce, P.L.C.

(57) ABSTRACT

A roaming authentication method based on WAPI. The present invention includes the steps of adopting a terminal and a wireless access point to initiate a WAPI security mechanism, relating the terminal to the wireless access point, and initiating a WAPI authentication process and so on. And a highly safe and convenient roaming authentication method based on WAPI is provided, so as to solve the technical problem that how the specific method of certificate roaming authentication is realized, the certificate of external network authentication server can not be obtained to establish a trustful relationship, and the terminal perhaps can not realize roaming authentication.

5 Claims, 1 Drawing Sheet

FOREIGN PATENT DOCUMENTS

| | | |
|---|---|---|
| CN | 101018411 A | 8/2007 |
| CN | 101056177 A | 10/2007 |
| CN | 101079891 A | 11/2007 |
| CN | 101159543 A | 4/2008 |
| CN | 101282352 A | 10/2008 |
| EP | 1707024 B1 | 1/2008 |

OTHER PUBLICATIONS

Fan Zhang and Jian-feng Ma. On the security and performance of WAPI. Journal of Xidian University. vol. 32, No. 2. (Ministry of Edu. Key Lab of Computer Networks and Info. Security, Xidian Univ., Xi'an 710071, China). Apr. 2005.

WLAN Standard GB15629.11 security mechanism—WAPI protocol analysis. Oct. 2004. Translation provided by Unitalen Attorneys at Law.

Fan Zhang and Jian-feng Ma. On the security and performance of WAPI. Journal of Xidian University. vol. 32, No. 2. (Ministry of Edu. Key Lab of Computer Networks and Info. Security, Xidian Univ., Xi'an 710071, China). Apr. 2005. Translation provided by Unitalen Attorneys at Law.

\* cited by examiner

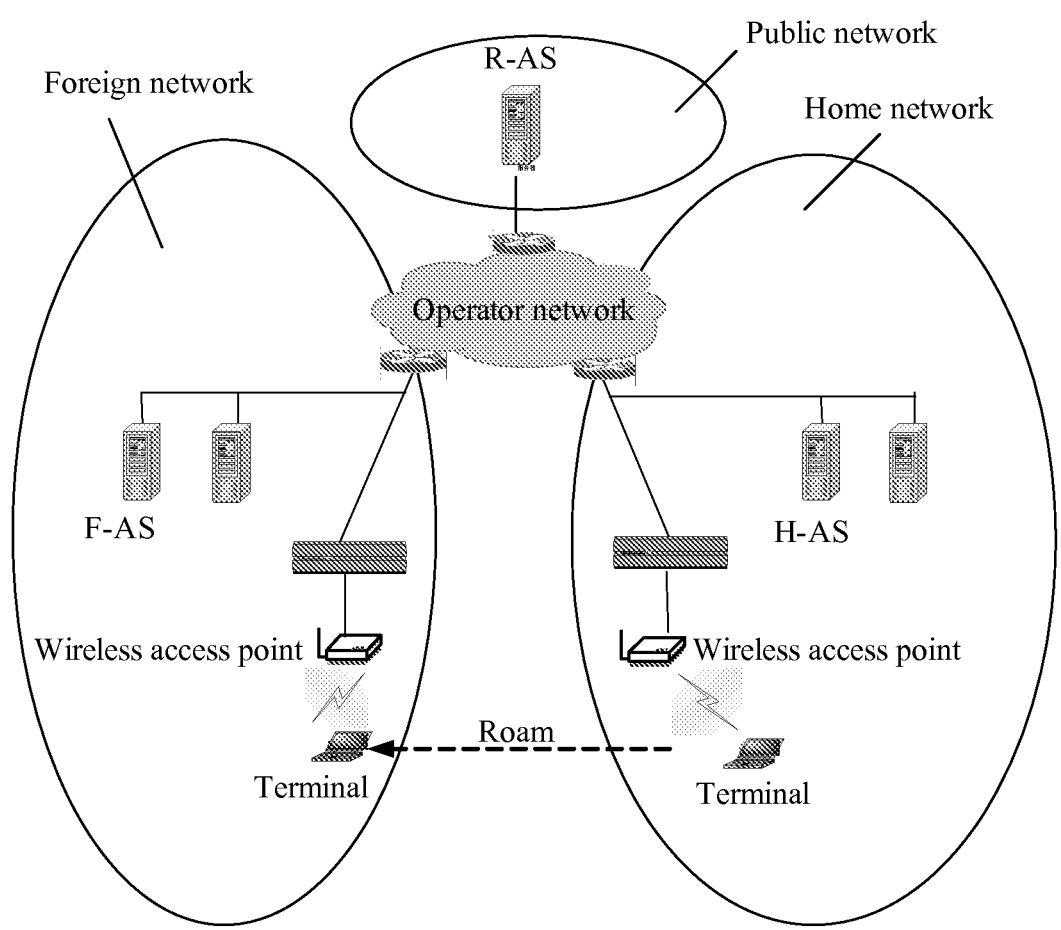

ROAMING AUTHENTICATION METHOD BASED ON WAPI

This application claims the priority to Chinese Patent Application No. 200810018166.0, filed with the Chinese Patent Office on May 9, 2008 and entitled "WAPI-BASED AUTHENTICATION METHOD FOR ROAMING", which is hereby incorporated by reference in its entirety.

FIELD OF THE INVENTION

The present invention relates to the field of systems for a secured network access, and in particular to a WAPI-based authentication method for roaming.

BACKGROUND OF THE INVENTION

Internet Protocol (IP) networks bear more and more services in various aspects of national economy and social life, and especially, wireless IP networks transmit data by radio wave to thereby make the networks physically open to an unprecedented extent. Therefore, the issue of secure access has become a crucial issue of securing the networks in operation.

The national standards GB 15629.11 and GB 15629.1102 for wireless local area networks were published in May, 2003 in P. R. China, which are initially published standards in the field of wireless local area networks in P. R. China. Also, the No. 1 amendment of the national standard for wireless local area networks, GB15629.11-2003/XGI-2006, and relevant sub-standards GB15629.1101, GB/T 15629.1103 and GB 15629.1104 were published in 2006, and thus a hierarchy of national standards for wireless local area networks is essentially formed. The hierarchy includes a new security mechanism of WLAN Authentication and Privacy Infrastructure (WAPI).

As demands for mobile computing services increase, users demand more for network access for roaming. A Wireless Local Area Network (WLAN) provides a user with a wireless access to the network, so that the user will not be constrained due to a single cable for an access to the network but can be flexibly mobile to satisfy a demand of the user for a mobile access to the network. When the WLAN is applied in operation scenarios, the network extends in scale to respective geographical areas throughout the country, thus resulting in a very large number of users and frequent occurrences of roaming. In the case of roaming, how to address the issue of authentication is a key to the normal operation of the network. The WAPI offers a security mechanism based upon a certificate and a pre-shared key. Particularly, the certificate mechanism is applicable to operation application scenarios. However, the national standards for the WLAN define only an interface for an AS to authenticate a certificate, but do not define any specific certification roaming authentication method.

There is disclosed in Patent Application 200710017450.1 a certification roaming authentication method based on WAPI, in which a roaming terminal firstly has to obtain a certificate of a foreign authentication server through a certain mechanism to establish a trust relationship, and then performs a certificate-based roaming authentication, and also, the authentication server has to obtain a certificate of a home authentication server of a user to establish a trust relationship. This may be infeasible in some practical situations because the terminal has no any other approach than a wireless WLAN to access a network and thus fails to obtain the certificate of the foreign authentication server and to establish any trust relationship. Consequently, the terminal may not perform the roaming authentication.

SUMMARY OF THE INVENTION

To address the problem of certification roaming authentication when the WAPI security mechanism is applied in the prior art, the present invention provides a highly secured and convenient WAPI-based authentication method for roaming.

The present invention provides a technical solution of a WAPI-based authentication method for roaming, wherein the method includes the steps of:

1) initiating a WAPI security mechanism between the terminal and a wireless access point, associating the terminal with the wireless access point to initiate a WAPI authentication process;

2) receiving, by a foreign-authentication server which the terminal accesses, a certificate authentication request packet from the wireless access point; and determines from information on a certificate of the terminal that the terminal has a roaming access, searching for, by the foreign-authentication server, a trusted home-authentication server in a local trusted list of foreign-authentication servers according to information on the trusted home-authentication server in the certificate of the terminal; transmitting, by the foreign-authentication server, a certificate-authentication-for-roaming request packet to the trusted home-authentication server if the trusted home-authentication server is found; transmitting, by the foreign-authentication server, a certificate-authentication-for-roaming request packet to an upper central root-authentication server if the trusted home-authentication server is not found;

3) receiving, by the home-authentication server, the certificate-authentication-for-roaming request packet, verifying the certificate of the terminal for legality, and returning a certificate-authentication-for-roaming response packet; or, receiving, by the root-authentication server, the certificate-authentication-for-roaming request packet, and transmitting the certificate-authentication-for-roaming request packet to an appropriate authentication server according to information on the trusted home-authentication server in the certificate-authentication-for-roaming request packet;

4) on receiving the certificate-authentication-for-roaming response packet, reconstructing, by the root-authentication server, a message authentication field in the certificate-authentication-for-roaming response packet according to information on the authentication server in the access domain in the certificate-authentication-for-roaming response packet, and transmitting the reconstructed certificate-authentication-for-roaming response packet to an appropriate authentication server; receiving, by the foreign-authentication server, the certificate-authentication-for-roaming response packet, parsing the certificate-authentication-for-roaming response packet, and returning a certificate authentication response packet to the wireless access point; and 5) performing, by the wireless access point and the terminal, an access control according to a certificate authentication result provided in the returned certificate authenticate response packet.

Preferably, after the foreign-authentication server which the terminal accesses receives the certificate authentication request packet from the wireless access point, the method further comprises: if the foreign-authentication server determines from the information on the certificate of the terminal that the terminal has a local access, authenticating the certificate of the terminal for legality and returning a certificate authentication response packet.

Preferably, after the home-authentication server or root-authentication server receives the certificate-authentication-for-roaming request packet, the method further comprises: verifying a message authentication field in the certificate-authentication-for-roaming request packet by a locally stored strategy, and discarding the certificate-authentication-for-roaming request packet if the certificate-authentication-for-roaming request packet fails to pass the verification.

Preferably, in the step of receiving, by the root-authentication server, the certificate-authentication-for-roaming request packet and transmitting the certificate-authentication-for-roaming request packet to an appropriate authentication server according to information on the trusted home-authentication server in the certificate-authentication-for-roaming request packet, the method further comprises: discarding the certificate-authentication-for-roaming request packet if no appropriate authentication server is found.

Preferably, the method further comprises: on receiving the certificate-authentication-for-roaming response packet, verifying, by the root-authentication server or the foreign-authentication server, a message authentication field in the certificate-authentication-for-roaming response packet by a locally stored strategy, and discarding the certificate-authentication-for-roaming response packet if the certificate-authentication-for-roaming response packet fails to pass the verification.

Preferably, the foreign-authentication server returns the certificate authentication response packet to the wireless access point in a format defined in the national standards for WLAN.

The authentication process in the steps 1 and 5) is performed following a WAPI authentication flow defined in the GB15629.11 series of national standards.

The present invention provides an authentication method based on WAPI certificate during roaming, which complies with the national standards for wireless local area networks and has the advantages of high security and convenience. Specifically, following the national standards for wireless local area networks, the present invention still adopts full bidirectional authentication for roaming to ensure that only a legal user can access a legal network and each obtained certificate is verified by signature to ensure the security of obtaining the certificate through the network. Moreover, a seamless access to the wireless network for roaming can be achieved for a roaming user without the need of going to any business site for replacement of the certificate and without any extra operation from the user.

BRIEF DESCRIPTION OF THE DRAWINGS

FIG. 1 illustrates a topology diagram of a WLAN operation application network according to the present invention.

DETAILED DESCRIPTION OF THE INVENTION

The present invention is described below in further detail with reference to embodiments to make the object, technical solution and advantages thereof more apparent.

Referring to FIG. 1, when a terminal, e.g., a laptop computer STA, roams from a home network to a foreign network, a specific roaming authentication procedure is as follows:

1) A WAPI security mechanism is initiated between the terminal STA and a wireless Access Point (AP), i.e., the terminal STA is associated with a wireless access point AP2 to initiate a WAPI authentication process.

2) A Foreign-Authentication Server (F-AS) which the terminal STA accesses receives a certificate authentication request packet from the wireless access point AP2 and determines from information on a certificate of the terminal STA whether the terminal STA has a local access or a roaming access. If F-AS determines that the STA has a local access, the F-AS authenticates the certificate of the terminal STA for legality and returns a certificate authentication response packet. If F-AS determines that the STA has a roaming access, the F-AS searches for a trusted Home-Authentication Server (H-AS) in a local trusted list of Foreign-Authentication Servers (F-AS) according to information on the trusted Home-Authentication Server (H-AS) in the certificate of the terminal STA. If the Home-Authentication Server (H-AS) is found in the trusted list, the F-AS transmits a certificate-authentication-for-roaming request packet to the Home-Authentication Server (H-AS). If no Home-Authentication Server (H-AS) trusted by the terminal STA is found in the local trusted list, the F-AS transmits a certificate-authentication-for-roaming request packet to an upper central Root-Authentication Server (R-AS).

3) On receiving the certificate-authentication-for-roaming request packet, an Authentication Server (AS) verifies a message authentication field in the certificate-authentication-for-roaming request packet by a locally stored strategy, and discards the certificate-authentication-for-roaming request packet if the certificate-authentication-for-roaming request packet fails to pass the verification. If the Authentication Server (AS) receiving the certificate-authentication-for-roaming request packet is the Home-Authentication Server (H-AS), the H-AS verifies the certificate of the terminal for legality and returns a certificate-authentication-for-roaming response packet. If the Authentication Server (AS) receiving the certificate-authentication-for-roaming request packet is the Root-Authentication Server (R-AS), the R-AS transmits the certificate-authentication-for-roaming request packet to an appropriate authentication Server (AS) according to the information on the Authentication Server (AS) trusted by the terminal in the certificate-authentication-for-roaming request packet and discards the certificate-authentication-for-roaming request packet if no appropriate Authentication Server (AS) is found.

4) On receiving the certificate-authentication-for-roaming response packet, the Authentication Server (AS) verifies a message authentication field in the certificate-authentication-for-roaming response packet by a locally stored strategy and discards the certificate-authentication-for-roaming response packet if the certificate-authentication-for-roaming response packet fails to pass the verification. If the Authentication Server (AS) receiving the certificate-authentication-for-roaming response packet is the Root-Authentication Server (R-AS), the R-AS reconstructs the message authentication field in the certificate-authentication-for-roaming response packet according to the information on the Authentication Server (AS) in the access domain in the certificate-authentication-for-roaming response packet and transmits the reconstructed certificate-authentication-for-roaming response packet to an appropriate authentication Server (AS). If the Authentication Server (AS) receiving the certificate-authentication-for-roaming response packet is the Foreign-Authentication Server (F-AS), the F-AS parses the certificate-authentication-for-roaming response packet and returns a certificate authentication response packet to the wireless access point AP2 in a format defined in the national standards for WLAN.

5) The wireless access point AP2 and the terminal STA perform an access control according to a certificate authentication result provided in the returned certificate authenticate response packet.

Following the national standards for wireless local area networks, the present invention still adopts full bidirectional authentication for roaming to ensure that only a legal user can access a legal network and each obtained certificate is verified by signature to ensure the security of obtaining the certificate through the network. Moreover, a seamless access to the wireless network for roaming can be achieved for a roaming user without the need of going to any business site for replacement of the certificate and without any extra operation from the user.

A WAPI-based authentication method for roaming according to the present invention has bee described above in detail, the principle and embodiments of the present invention have been set forth in the specification in connection with several examples, and the foregoing description of the embodiments is merely intended to facilitate understanding of the method of the present invention and the essence thereof. Also those ordinarily skilled in the art can vary the embodiments and their application scopes in light of the present invention. Accordingly, the disclosure in the specification shall not be constructed in any sense of limiting the present invention.

The invention claimed is:

1. A Wireless Local Area Network (WPAN) Authentication and Privacy Infrastructure (WAPI)-based authentication method for roaming, comprising the steps of:

initiating a WAPI security mechanism between the terminal and a wireless access point by associating the terminal with the wireless access point to initiate a WAPI authentication process;

receiving, by a foreign-authentication server which the terminal accesses, a certificate authentication request packet from the wireless access point; and determines from information on a certificate of the terminal that the terminal has a roaming access, searching for, by the foreign-authentication server, a trusted home-authentication server in a local trusted list of foreign-authentication servers according to information on the trusted home-authentication server in the certificate of the terminal; transmitting, by the foreign-authentication server, a certificate-authentication-for-roaming request packet to the trusted home-authentication server if the trusted home-authentication server is found; transmitting, by the foreign-authentication server, a certificate-authentication-for-roaming request packet to an upper central root-authentication server if the trusted home-authentication server is not found;

receiving, by the home-authentication server, the certificate-authentication-for-roaming request packet, verifying the certificate of the terminal for legality, and returning a certificate-authentication-for-roaming response packet; or, receiving, by the root-authentication server, the certificate-authentication-for-roaming request packet, and transmitting the certificate-authentication-for-roaming request packet to an appropriate authentication server according to information on the trusted home-authentication server in the certificate-authentication-for-roaming request packet;

on receiving the certificate-authentication-for-roaming response packet, reconstructing, by the root-authentication server, a message authentication field in the certificate-authentication-for-roaming response packet according to information on the authentication server in the access domain in the certificate-authentication-for-roaming response packet, and transmitting the reconstructed certificate-authentication-for-roaming response packet to an appropriate authentication server;

receiving, by the foreign-authentication server, the certificate-authentication-for-roaming response packet, parsing the certificate-authentication-for-roaming response packet, and returning a certificate authentication response packet to the wireless access point; and performing, by the wireless access point and the terminal, an access control according to a certificate authentication result provided in the returned certificate authenticate response packet, wherein the foreign-authentication server returns the certificate authentication response packet to the wireless access point in a format defined in the national standards for WLAN.

2. The WAPI-based authentication method for roaming according to claim 1, wherein after the foreign-authentication server which the terminal accesses receives the certificate authentication request packet from the wireless access point, the method further comprises: if the foreign-authentication server determines from the information on the certificate of the terminal that the terminal has a local access, authenticating the certificate of the terminal for legality and returning a certificate authentication response packet.

3. The WAPI-based authentication method for roaming according to claim 1, wherein after the home-authentication server or root-authentication server receives the certificate-authentication-for-roaming request packet, the method further comprises: verifying a message authentication field in the certificate-authentication-for-roaming request packet by a locally stored strategy, and discarding the certificate-authentication-for-roaming request packet if the certificate-authentication-for-roaming request packet fails to pass the verification.

4. The WAPI-based authentication method for roaming according to claim 1, wherein in the step of receiving, by the root-authentication server, the certificate-authentication-for-roaming request packet and transmitting the certificate-authentication-for-roaming request packet to an appropriate authentication server according to information on the trusted home-authentication server in the certificate-authentication-for-roaming request packet, the method further comprises: discarding the certificate-authentication-for-roaming request packet if no appropriate authentication server is found.

5. The WAPI-based authentication method for roaming according to claim 1, further comprising: on receiving the certificate-authentication-for-roaming response packet, verifying, by the root-authentication server or the foreign-authentication server, a message authentication field in the certificate-authentication-for-roaming response packet by a locally stored strategy, and discarding the certificate-authentication-for-roaming response packet if the certificate-authentication-for-roaming response packet fails to pass the verification.

* * * * *